United States Patent [19]
Prentice et al.

[11] Patent Number: 5,886,494
[45] Date of Patent: Mar. 23, 1999

[54] POSITIONING SYSTEM

[75] Inventors: Thomas C. Prentice, Westford, Mass.; Brian P. Prescott, Fremont, N.H.

[73] Assignee: Camelot Systems, Inc., Haverhill, Mass.

[21] Appl. No.: 967,682

[22] Filed: Nov. 10, 1997

Related U.S. Application Data

[63] Continuation-in-part of Ser. No. 796,236, Feb. 6, 1997.

[51] Int. Cl.⁶ ............................... B23Q 3/18; G05D 3/12
[52] U.S. Cl. ..................... 318/625; 33/1 M; 74/471 XY; 414/744.4
[58] Field of Search ..................................... 318/625, 649, 318/687; 33/1 M; 74/471 XY; 108/51.1; 269/55, 71; 414/744.1, 744.2, 744.4

[56] References Cited

U.S. PATENT DOCUMENTS

| | | |
|---|---|---|
| 4,176,455 | 12/1979 | Copeland et al. ............................ 33/1 |
| 4,838,515 | 6/1989 | Prentice . |
| 4,979,093 | 12/1990 | Laine et al. . |
| 5,092,021 | 3/1992 | Buzzi . |
| 5,097,577 | 3/1992 | Buzzi et al. . |
| 5,213,559 | 5/1993 | Lunazzi . |
| 5,378,282 | 1/1995 | Pollard .................................. 118/697 |
| 5,486,151 | 1/1996 | Bergmann et al. . |
| 5,807,044 | 9/1998 | Watari et al. . |

FOREIGN PATENT DOCUMENTS

| | | |
|---|---|---|
| 0 508 130 A1 | 10/1992 | European Pat. Off. . |
| 0 700 733 A1 | 3/1996 | European Pat. Off. . |
| 2 398 937 | 2/1979 | France . |
| 2 621 715 | 4/1989 | France . |
| 42 34 675 A1 | 4/1993 | Germany . |

OTHER PUBLICATIONS

Ing, et al. "The Hexapod Principle" Laboratory for Machine Tools and Production Engineering at Aachen University of Technology, Germany.

Hexel Corporation brochure "Hexel's Hexapod Solutions", Portsmouth, NH 03801.

Cooke, Arthur, et al. Advanced reconfigurable machine for flexible fabrication. *1995 North AmericanConference on Smart Structures and Materials,* San Diego, CA, Feb. 26–Mar. 3, 1996.

*Primary Examiner*—Bentsu Ro
*Attorney, Agent, or Firm*—Mintz, Levin, Cohn, Ferris, Glovsky and Popeo

[57] ABSTRACT

A positioning system for moving a device over an xy-plane has a drive mechanism with pivotable arms for moving a carriage over the xy-plane by driving it from one side. This drive mechanism allows the system to be made narrow along the other side.

1 Claim, 8 Drawing Sheets

POSITIONING SYSTEM

RELATED APPLICATION

This application is a continuation in part of U.S. patent application No. 08/796,236 filed Feb. 6, 1997.

BACKGROUND OF THE INVENTION

This invention relates to a positioning system, and particularly to a system for positioning equipment, such as a liquid dispenser, with high precision over at least a two dimensional plane.

Coordinate positioning systems are used to carry instruments along two or three orthogonal axes to desired locations to perform some task, such as liquid dispensing, testing and measuring, placement of components, inspection, or milling. While a number of devices use such a positioning system, the system of the present invention is described for use with a liquid dispensing system that dispenses small quantities of liquid, such as dots of epoxy or an encapsulating liquid, on a printed circuit board. It being understood that embodiments of the present invention are not limited to liquid dispensing systems.

Figure 1:
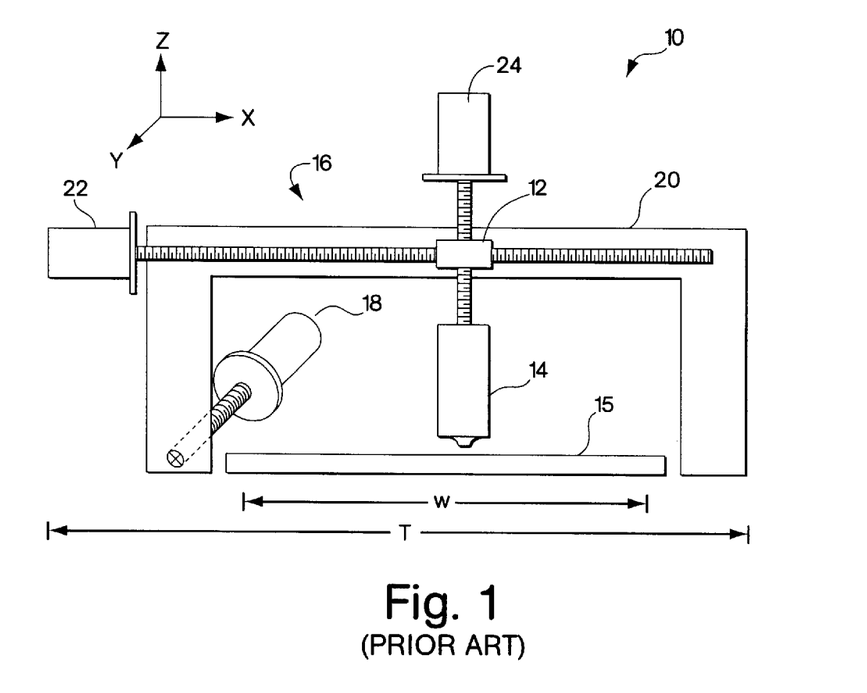
FIG. 1 is a pictorial side view of a known type of positioning system.

FIG. 1 is a general representation of a known positioning device 10 for moving a carriage 12 that holds a liquid dispensing device 14 over a workpiece 15. Device 10 has a gantry 16 that is moved with a first motor 18 along a y-axis. Gantry 16 has a horizontal beam 20 along which a second motor 22 moves carriage 12 along an x-axis. Dispensing device 14 is moved along a vertical z-axis with a third motor 24. Movement along any or all of these axes can be accomplished with a lead screw as shown here, with a belt drive, with a rack and pinion, or using linear motors. Note that FIG. 1 is merely a general representation for illustrative purposes, but many other configurations for this general type of positioning device have been used; for example, a vertical beam can be moved along the x-axis, while the vertical beam supports a separate horizontal beam that is movable relative to the vertical beam.

For a given device with a positioning system, the device has a total area that the device takes up (a "footprint"), and a workable area, defined here in the xy-plane, over which the device operates on workpieces 15. To work in this workable area along the x and y axes, the device needs additional space along the x and y axes to accommodate motors and beams, bearings sufficient to hold the carriage firmly, and any other needed components. In a typical system, it is not uncommon along the x-axis for the working area W to be no more than 70% of the total width T of the device (note that FIG. 1 is not to scale). With the increasing expense of manufacturing floor space, particularly in clean room environments, it would be desirable to be able to reduce the amount of space that is needed to operate in a given work area, i.e., to reduce the footprint and thereby increase W/T along at least one axis.

SUMMARY OF THE INVENTION

The present invention includes a positioning system for moving a device at least in a plane, defined here by orthogonal x and y axes. A carriage system can be mounted for movement along x and y axes, preferably with drive mechanisms operated along one axis to create movement in the xy-plane.

In a preferred embodiment, the system has a frame, such as a platform or rails, a plate slidably mounted to the frame to move along a first axis, and a carriage slidably mounted to the plate for movement along a second axis perpendicular to the first axis. The system has two blocks, preferably spaced apart for stability, with each block being separately movable along the first axis, and with each block having a rigid arm pivotally connected to the block at one end of the arm and pivotally connected to the carriage at another end of the arm. Each block is separately driven along one axis, e.g., with a lead screw or a belt drive, to cause the carriage to move relative to the plate and thereby to cause the arms to push or pull the carriage along the second axis and the plate along the first axis.

Positioning systems in accordance with embodiments of the present invention can be used with a number of different instruments, including a liquid dispensing device, a pick and place machine, machine tools, vision inspection systems, systems utilizing electrical or mechanical probes, and coordinate measuring machines.

In embodiments of the present invention, the drive mechanisms are both mounted to operate along the first axis, and therefore, the device can be made very narrow relative to the working area along the second axis, such that the ratio of the width of the working area to the total width of the device can be as much as 90%. With motors mounted along one axis and on one side, a y-axis mechanism need not carry or support an x-axis motor and need not include an x-axis driving mechanism as in prior devices; this structure thus avoids use of an x-axis driving mechanism that can create heat and add mass to the moving plate, either of which can adversely affect performance (compare to FIG. 1), and further simplifies the system because there is no requirement to carry x-axis cables and/or belts. The present invention provides these benefits while also maintaining good stability because the movable blocks are spaced apart at ends along the x-axis. Another benefit is that the motors, on average, each carry 50% of the load, and therefore can be evenly matched. Other features and advantages will become apparent from the following detailed description, drawings, and claims.

DETAILED DESCRIPTION

Figure 2:
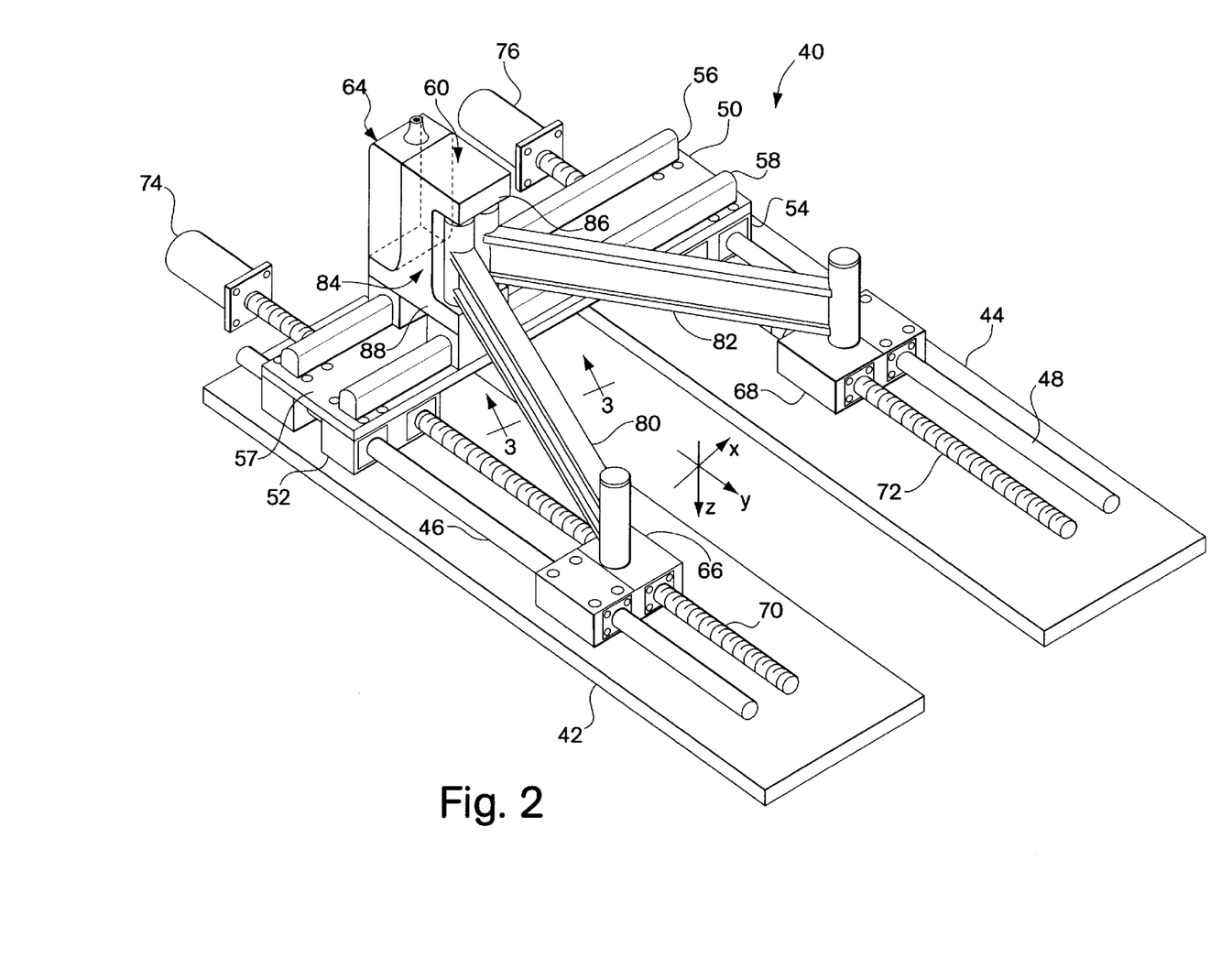
FIG. 2 is a perspective view of a positioning system according to an embodiment of the present invention.

FIG. 2 is a perspective view of a positioning system 40 according to the present invention (shown upside-down to better illustrate the components). Positioning system 40 has a first rail 42 and a parallel second rail 44 with respective first and second elongated bearings 46, 48 oriented in parallel along a y-axis and spaced apart along the perpendicular x-axis. Extending across the first and second rails 42, 44 is a plate 50 that is slidably mounted to rails 42, 44 and movable along bearings 46, 48 with blocks 52, 54 rigidly mounted at each end of plate 50. Bearings in addition to bearings 46 and 48 may be used to provide additional stiffness.

Plate 50 has two elongated bearings 56, 58 extending in parallel along the x-axis and on a side 57 of plate 50 that faces away from rails 42, 44. A carriage 60 is slidably mounted to plate 50 for movement over bearings 56, 58 along the x-axis. Although in this illustrative embodiment, two bearings 56 and 58 are used, only one bearing, or more than two bearings could be used. Carriage 60 supports a mechanism for performing work on a workpiece 64, such as a liquid dispenser, movable along the z-axis with a motor and a belt or a lead screw (not shown).

First and second driven nut blocks 66, 68 are mounted over rails 42, 44 and are slidably movable along the y-axis over bearings 46, 48. Each nut block 66, 68 can be separately driven with respective lead screws 70, 72 and motors 74, 76. In FIG. 2, motors 74, 76 are shown located at the back end of the gantry. These motors can also be located at the front end of the gantry, at the opposite end of the lead screws from the location shown in FIG. 2.

Carriage 60 is connected to each nut block 66, 68 with respective rigid trailing arms 80, 82 that are pivotally connected at one end to one of the nut blocks and pivotally connected at another end to carriage 60. To make these pivotal connections to carriage 60, the carriage has a C-shaped end 84 with two vertically oriented bearings extending from a top portion 86 to a bottom portion 88 of end 84. Each nut block also has a vertically oriented bearing for pivotal connection to one of the trailing arms. The trailing arms are secured to the bearings on the nut blocks. These bearings, and the others described above, are preferably pre-loaded and are mounted under compression so that there is substantially no unwanted relative movement in any direction.

Figure 3:
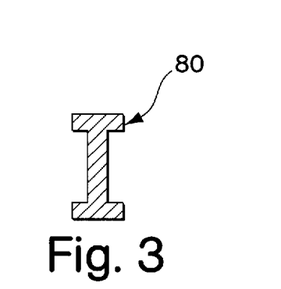
FIG. 3 is a cross-sectional view of a trailing arm taken through section lines 3—3 of FIG. 2.

Referring to FIG. 3, trailing arms 80, 82 are preferably shaped as vertically oriented I-beams to resist deflections along the z-axis. Trailing arms 80, 82, and also plate 50 and carriage 60, should be made of a light-weight and stiff material, such as aluminum, titanium, or magnesium.

Figure 4:
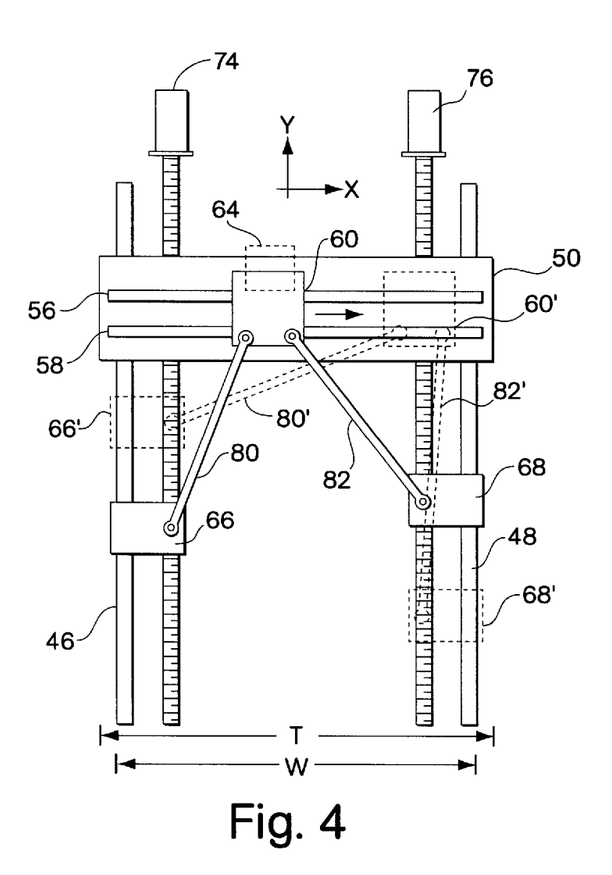
FIG. 4 is a plan view illustrating movement of the positioning system

Referring to FIG. 4, an example of movement by carriage 60 along the x-axis with only y-axis movements of the drive mechanisms is illustrated. In an initial position, carriage 60 is shown slightly left of center on movable block 50, and first nut block 66 on the left side is spaced slightly further from plate 50 along the y-axis than is second nut block 68. To move carriage 60 to a position 60' on the right hand side of movable plate 50, first nut block 66 is drawn closer to movable plate 50 to a position 66' and second nut block 68 is moved further away from plate 50 to a position 68', and therefore trailing arms 80, 82 move to positions 80' and 82'. These movements cause the carriage to have x-axis movement. As indicated here, the trailing arms can move over a range of angles relative to the x and y axes, and the combination of these varying angled movements can be used for controllable two-dimensional movement.

It should be apparent that y-axis movement of plate 50 (and hence carriage 60) can be achieved by moving nut blocks 66, 68 an equal amount at the same time along the y-axis. Moreover, the x-axis movement can be combined with y-axis movement by appropriately moving the first and second nut blocks. For example, if each block is moved in the same direction with one block being moved a little more than the other, the carriage will have y-axis movement and also some x-axis movement; or if one block is moved and the other is not, there will be both x-axis and y-axis movement. While the movement in the system according to the present invention is more complex than prior systems because the movement is non-linear, such movement can be programmed and then calculated with a processor using standard trigonometric calculations.

FIG. 4 also illustrates an important advantage of the system according to the present invention. As shown here, the total width T of the system is not much wider than the width of the working area W, such that a ratio W/T can be as much as 90%. In theory the x-axis width T need only exceed working area W by an amount equal to about one-half the width of carriage 60 on each side.

Figure 5:
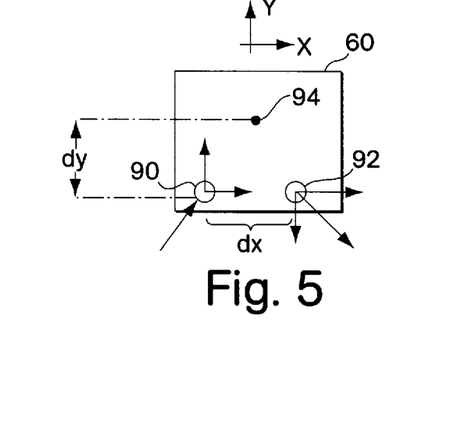
FIG. 5 is a plan view of the carriage, illustrating forces on the carriage during operation.

Referring to FIG. 5, while both arms could be connected to a single pivot point, e.g., with a knuckling arrangement, it is more desirable to have two spaced points 90, 92 to reduce yaw motion. Assuming a rightward movement by carriage 60 as shown in FIG. 4, a force will be directed at an angle into first point 90 and will be directed at an angle away from second pivot point 92. If the movement is solely along the x-axis, the net magnitude of the y- components of the vectors should cancel out, leaving only an x-component, but nonetheless causing a clockwise moment because pivot points 90, 92 are spaced apart. If a center of gravity 94 of carriage 60 is spaced from pivot points 90, 92, a counter-clockwise rotational moment is introduced with the rightward movement of the carriage. The distance dx between the pivot points and the distance dy between pivot points 90, 92 and center of gravity 94 can be optimized with mathematical calculations; the optimization can be performed in one of a number of different ways, e.g., so that the average clockwise and counter-clockwise moments are minimized over a given range of motion, or to minimize the net peak moment for the entire range of motion of carriage 60. This arrangement reduces yaw, while the orientations of the stiff trailing arms reduce pitch and roll in the carriage.

Figure 6:
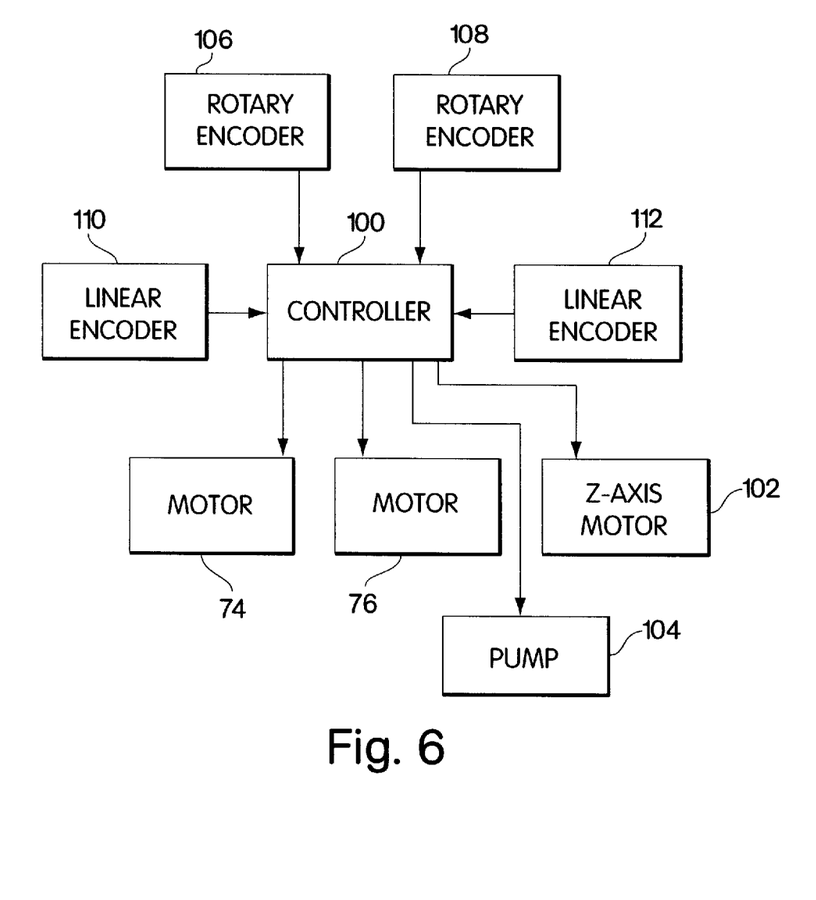
FIG. 6 is a block diagram of a control system.

Referring to FIG. 6, a programmable controller 100 for controlling the functions of the system in accordance with one embodiment of the present invention is provided. In one embodiment, the controller 100 is implemented using a personal computer with an Intel Pentium® processor running a version of the Microsoft Windows® NT operating system. Controller 100 provides signals to motors 74, 76 to cause the motors to move the nut blocks as indicated in FIG. 4; controls a z-axis motor 102 to cause the motor to move vertically along the z-axis along with a pump 104 for dispensing liquid; and controls pump 104 to dispense liquid as desired. In other embodiments of the present invention, the controller can be programmed to control workpieces other than the pump 104, such as a gripping tool, a machining tool, a vision system, electrical and mechanical probes, gauges and touch probes.

In the embodiment shown in FIG. 6, to determine the position of plate 50 and carriage 60 at a given time in the xy-plane, controller 100 receives signals from rotary encoders 106, 108 and from linear encoders 110, 112. Each rotary encoder is mounted in one of motors 74, 76 and provides data to the controller based on the amount of rotation of the motor, thus translating into y-axis movement by the nut blocks. One of the linear encoders is mounted along the y-axis to sense y-axis movement and position of plate 50, and the other linear encoder is mounted on plate 50 to sense movement and position of carriage 60 relative to plate 50 along the x-axis. In this manner, the encoders are used to provide feedback signals to control the motors. In servo control terms, the linear encoders are used to close a positional control loop, while the rotary encoders are used to close a velocity control loop, so that the velocity of movement, as well as the position of the head, is precisely controlled.

In another embodiment of the present invention, to determine the position of plate 50 and carriage 60 at a given time in the xy-plane, the controller 100 receives signals from rotary encoders 106, 108 and from three linear encoders 110, 112 and 114. As in the previously described embodiment, each of the rotary encoders 106 and 108 is used to close the velocity control loop, and the three linear encoders are used to control the position control loop.

Figure 7:
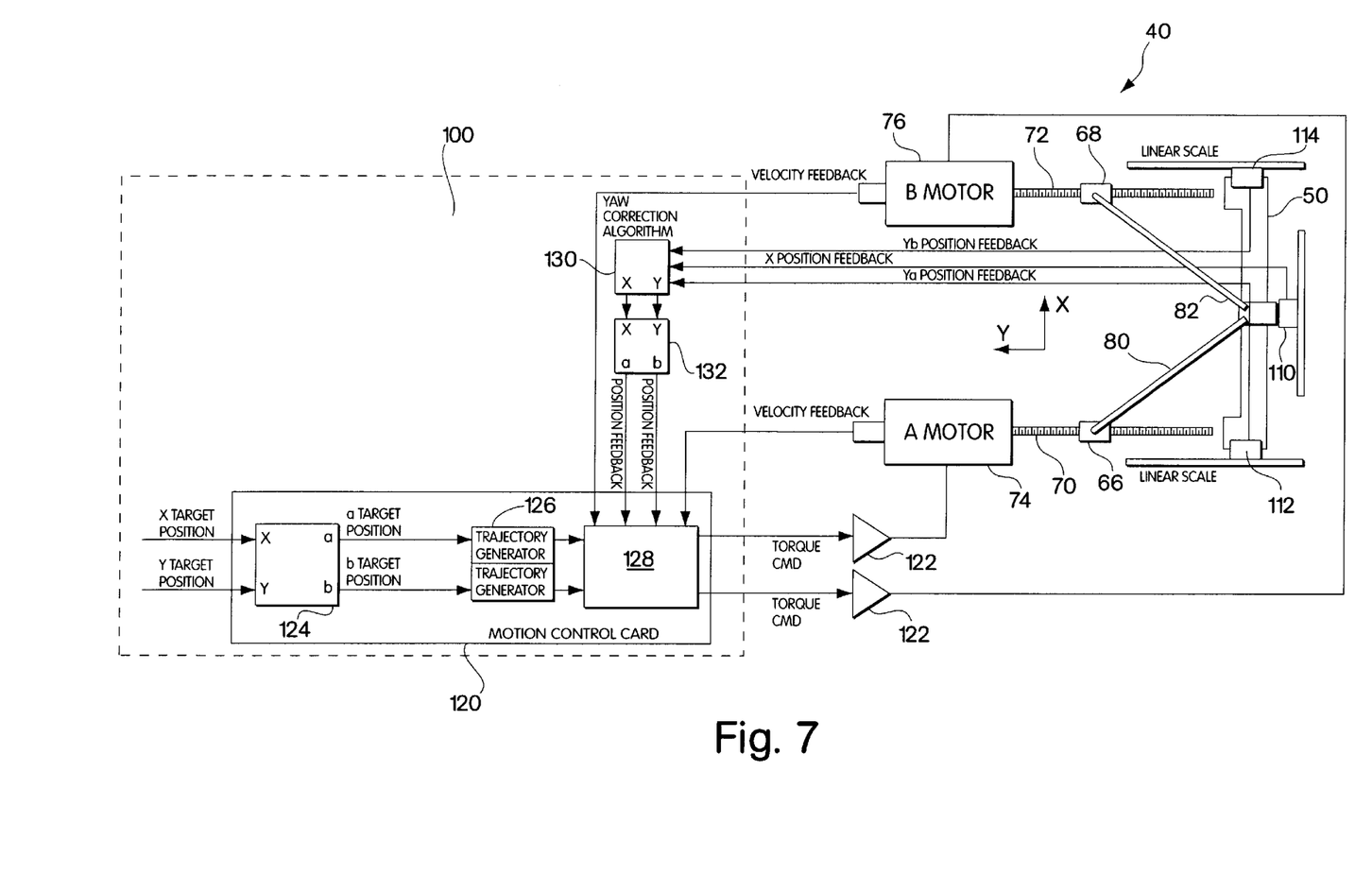
FIG. 7 is a block diagram of a positioning system in accordance with one embodiment of the present invention.

As shown in FIG. 7, each of the linear encoders 110, 112 and 114 is mounted on the plate 50. Linear encoder 110 is used to sense movement and position of the carriage 60 relative to the plate 50 along the x-axis. Linear encoders 112 and 114 are mounted on opposite ends of the plate 50 and are used to sense y-axis movement and position of the plate 50. Two encoders are used to determine y-axis position to account for any yaw errors introduced in the plate. The actual y-axis position of the workpiece 64 is determined by interpolating between the two y-axis positions based on the x-axis position.

The control of the system in accordance with embodiments of the invention will now be further described with reference to FIGS. 7–10. FIG. 7 shows the positioning system 40 and the controller 100 in block diagram form. The controller 100 includes a motion control card 120 that receives x and y target position signals generated within the controller based on user input or a pre-programmed task. The motion control card provides output signals that drive torque mode amplifiers 122 that in turn drive motors 74 and 76. In one embodiment of the present invention, the motion control card is implemented using a Delta Tau PMAC2 Ultralight Controller available from Delta Tau Data Systems, Inc., Northridge, Calif.

Figure 10:
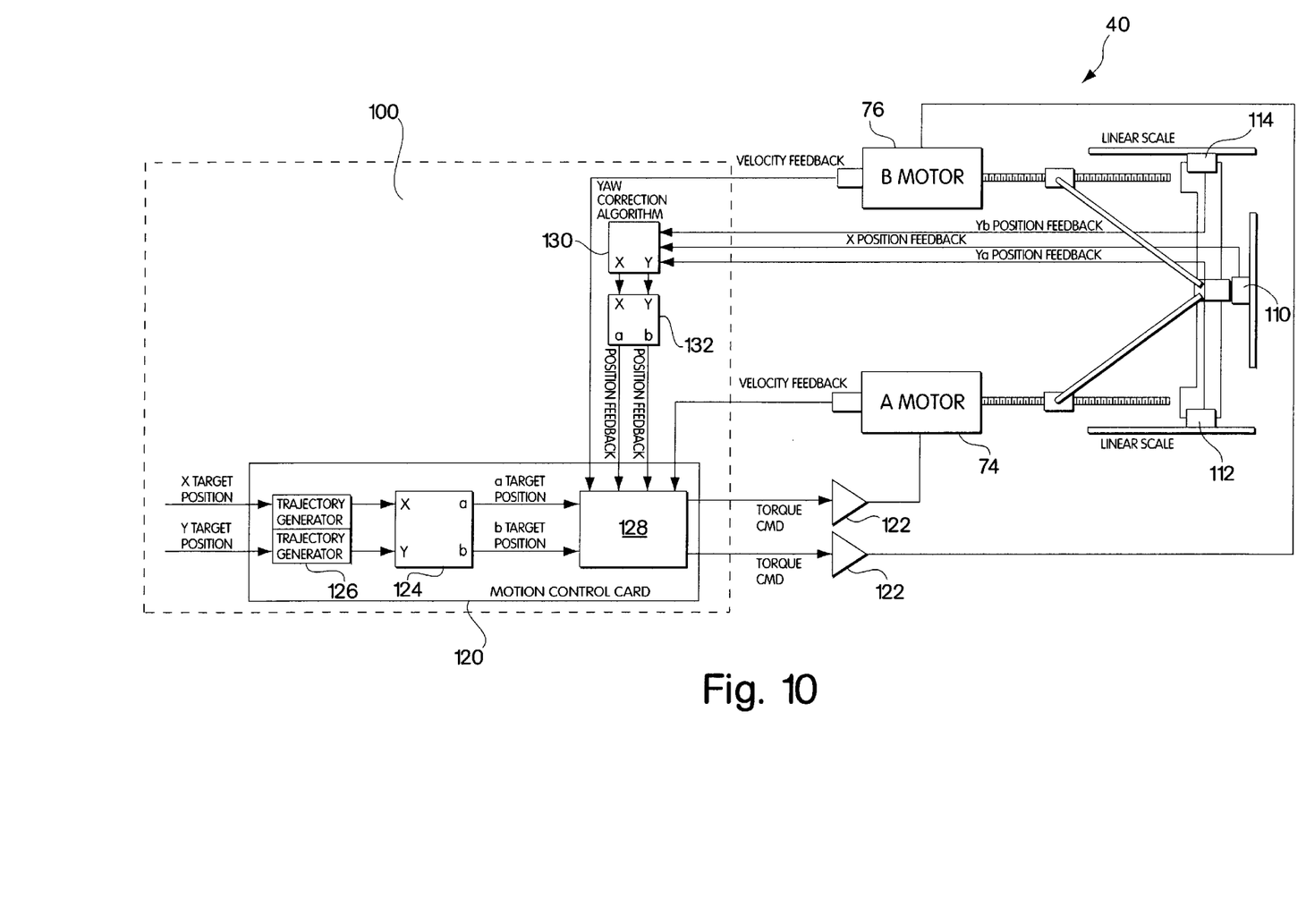
FIG. 10 is a block diagram of a positioning system in accordance with one embodiment of the present invention.

In FIGS. 7 and 10, motors 74 and 76 are respectively identified as motors A and B, and the position of nutblock 66 along lead screw 70 is identified as "a" and the position of nutblock 68 along lead screw 72 is identified as "b". The x/y position of the workpiece 64 is translatable to a unique a/b position of the nutblocks, and thus, the a and b positions define a coordinate system identified herein as the a/b coordinate system. Typical inputs to the motion control card, as well as the feedback signals from the linear encoders 110, 112 and 114 are expressed in terms of the x/y coordinate system, while the motor control signals generated by the motion control card are in terms of the a/b coordinate system. Thus, the controller 100 must provide a transformation between the x/y coordinate system and the a/b coordinate system.

Figure 8:
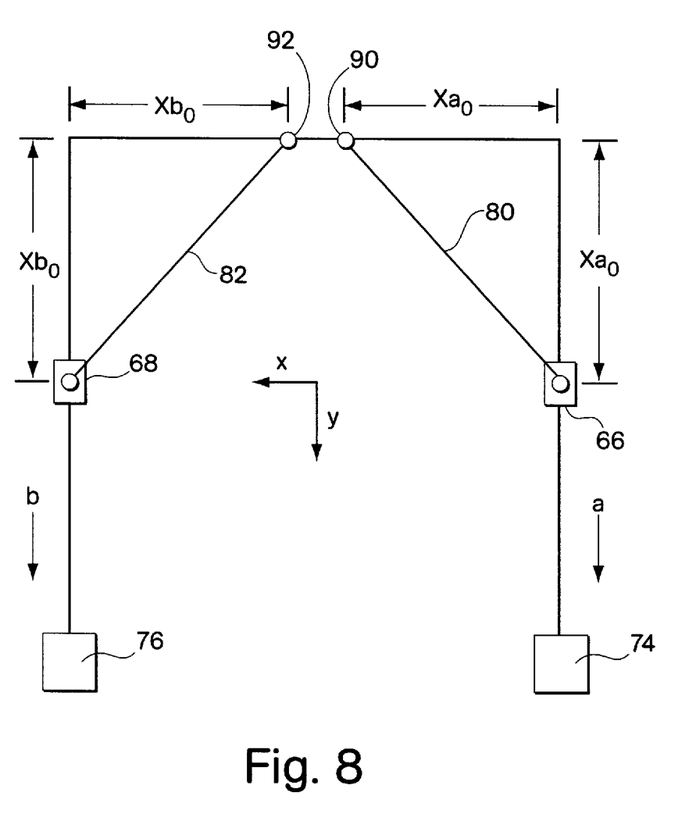
FIG. 8 is a diagram illustrating coordinate axes systems used in embodiments of the present invention.
Figure 9:
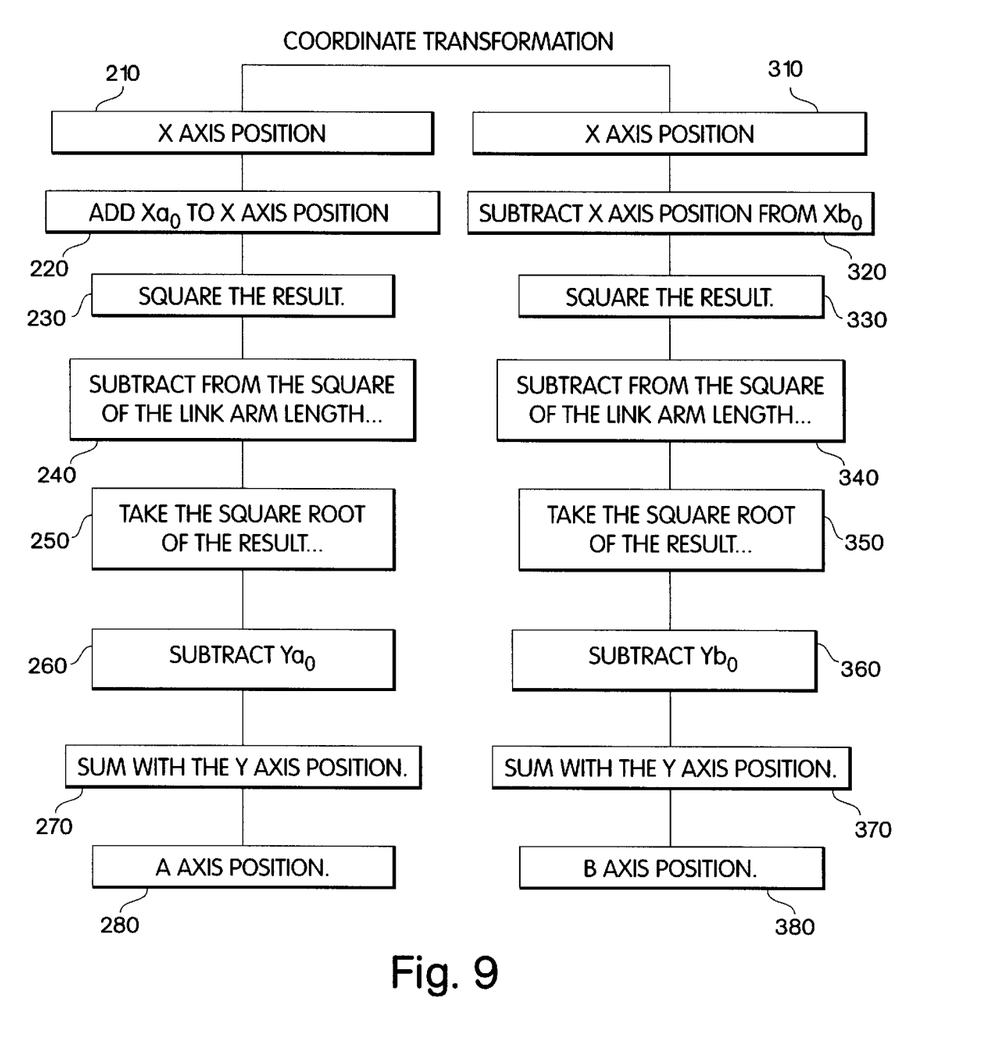
FIG. 9 is a flow chart illustrating a coordinate transformation method used in embodiments of the present invention.

The transformation from the x/y coordinate system to the a/b coordinate system will now be explained with reference to FIGS. 8 and 9. For the purposes of the transformation described herein, and with reference to FIG. 8: the origin of the x-axis is defined as the midpoint of the carriage 60; the origin of the y-axis is defined as the furthest position, in the y-direction, from the motors 74 and 76 at which the workpiece may be positioned; the origin of the a-axis is defined as the position of the bearing on nutblock 66 when the workpiece is positioned at the x and y origins; and the origin of the b-axis is defined as the position of the bearing on nutblock 68 when the workpiece is positioned at the x and y origins. Also for the purposes of this transformation: the distance along the x-axis from the center of lead screw 70 to pivot point 90 when the workpiece is at the origin of the x-axis is defined as $Xa_0$; the distance along the x-axis from the center of lead screw 72 to pivot point 92 when the workpiece is at the origin of the x-axis is defined as $Xb_0$; the distance along the y-axis from the bearing on nutblock 66 to the workpiece when the workpiece is at the origin of the y-axis is equal to $Ya_0$; and the distance along the y-axis from the bearing on nutblock 68 to the workpiece when the workpiece is at the origin of the y-axis is equal to $Yb_0$.

The a-axis value for a given x-axis value and y-axis value is determined as follows. In an initial step 210, an x-axis value is provided, and in step 220, the x-axis value is added to $Xa_0$. In step 230, the result obtained in step 220 is squared, and in step 240, the result of step 230 is subtracted from the square of length of trailing arm 80. Then, the square root of the result of step 240 is taken in step 250, and in step 260, $Ya_o$ is subtracted from the result of step 250. Finally, in step 270, the y-axis value is added to the result of step 260 providing the a-axis value in step 280.

In a similar manner, the b-axis value for a given x-axis value and y-axis value is determined as follows. In an initial step 310, the x-axis value is provided, and in step 320, the x-axis value is subtracted from $Xb_0$. In step 330, the result obtained in step 320 is squared, and in step 340, the result of step 330 is subtracted from the square of the length of the trailing arm 82. Then, the square root of the result of step 340 is taken in step 350, and in step 360, $Yb_0$ is subtracted from the result of step 350. Next, in step 370, the y-axis value is added to the result of step 360, providing the b-axis value in step 380. As understood by those skilled in the art, steps other than those specifically described above may be used to transform the x and y values to corresponding a and b values.

As described above, in the embodiment of the invention shown in FIG. 7, the motion control card 120 provides motor control signals to motors 74 and 76. The motion control card includes a transformation block 124, a trajectory generator 126 and a PID control block 128. The transformation block 124 provides transformation of the x and y input values to a and b values as described above. The trajectory generator generates a number of position and velocity values defining a trajectory from a present a/b position to a desired a/b position. The values generated by the trajectory generator are used by the PID control block in conjunction with feedback information from the encoders to position the head to the target position. As understood by those skilled in the art, the functional blocks contained within the motion control card may be implemented using software, hardware, or a combination of hardware and software.

Positional feedback information from encoders 110, 112 and 114 are input into a yaw correction algorithm block 130 from which the x and y positional feedback values are output. The x value output from block 130 is equal to the x value input to block 130. The y value output from block 130 is calculated, as described above, by interpolating the values from encoders 112 and 114 based on the x value from encoder 110. In embodiments requiring less accuracy, or in which the yaw error of the carriage is insignificant, and in which only one y encoder is used, the yaw correction block may not be used.

The x and y values output from the yaw correction block are input to a transformation block 132, which is similar to transformation block 124 and generates a and b output values. The a and b output values are input into the PID control block 128, where they are compared with the values generated by the trajectory generator to produce the output motor control signals.

The embodiment of the invention shown in FIG. 7 is most useful for applications in which the workpiece is moved from a first position to a second position without a required path from the first position to the second position. The trajectory generator is programmed to provide the most efficient path from the first position to the second position using the a/b coordinate system. The most efficient path is typically a "linear path". However, a linear path generated using the a/b coordinate system may not correspond to a straight line in the x/y coordinate system.

For applications requiring that specific paths be followed (i.e., lines, arcs, circles), it is preferred that the embodiment of the invention shown in FIG. 10 be utilized. The embodiment shown in FIG. 10 is identical to the embodiment shown in FIG. 7 except that the relative placement of the coordinate transform block 124 and the trajectory generator 126 have been reversed. This allows the trajectory generator to generate trajectories based on the x/y coordinate system rather than based on the a/b coordinate system. The system shown in FIG. 10 does place an extra burden on the transformation block 124 since, for each x/y position entered, coordinate transformation must be performed for a number of positions, as required by the trajectory generator, rather than for just one position, as in the system of FIG. 7.

In a particular embodiment of the present invention, a dispensing system utilizes one of the positioning systems described above, and the workpiece comprises a liquid dispenser that is used to dispense liquid on printed circuit boards for one of a number of purposes, such as to dispense small dots of epoxy liquid on the circuit board; to provide an encapsulating material over a die on a circuit board for chip-on-board mounting; or to dispense a liquid under-fill material around an electronic component spaced slightly above a circuit board for wicking under the component. The types of material used and the methods of operation are different for these dispensing applications, and therefore different dispensers would be used for performing these different functions, however, all of these functions could be performed using embodiments of the positioning system described above.

In one example, a number of circuit boards are processed so that dots of liquid are dispensed. The locations for the dots are entered into the system and provided to the controller. The controller uses an optimizing function to decide the order in which the dots are to be dispensed, typically to reduce the amount of travel of the dispenser in the xy-plane. Boards are brought to the system with a conveyor system. For each dot to be dispensed, the controller moves the carriage and dispenser to a desired location in the xy-plane, activates the z-axis motor to lower the dispenser to the circuit board, activates the dispenser to cause the dispenser to dispense a small quantity of liquid at that location, and causes the z-axis motor to move away from the circuit board. The carriage is then moved to another position in the xy-plane. Alternatively, it is desirable to combine x/y motion with the z-axis motion in a ballistic trajectory.

In another embodiment of the present invention, a pick and place machine utilizes one of the positioning systems described above, and the workpiece comprises a vacuum pick-up tool or gripper. The vacuum pick-up tool or gripper is positioned over a component to be picked up, the component is picked up by the gripper, and the gripper and component are moved using the positioning system to a predetermined position over a substrate, such as a circuit board, where the component is placed on the circuit board.

In yet another embodiment of the present invention, a machining tool utilizes one of the positioning systems described above, and the workpiece comprises a tool for performing an operation on a product. The product is loaded into the machine, and the positioning system positions the tool at predetermined positions on the product to perform the operation. In one embodiment, the tool may be a milling spindle for performing a milling operation.

In still another embodiment of the present invention, a vision inspection system utilizes one of the positioning systems described above, and the workpiece comprises a camera, a lens, and/or an illumination system. The camera may be positioned over one or more objects loaded into the device for inspecting or aligning the objects.

In another embodiment of the present invention, an electrical and/or mechanical inspection system utilizes one of the positioning systems described above, and the workpiece comprises one or more electrical and/or mechanical probes. The probes may be positioned over a product and specific points on the product may be mechanically or electrically tested using the probes. In a related embodiment, a coordinate measuring machine may utilize one of the positioning systems to position a gauge probe or touch probe for the purpose of gathering dimensional information about an object.

In a preferred embodiment of the present invention, two or more of the positioning systems described above may be incorporated in one apparatus for positioning a number of different workpieces. One example of such an apparatus is a multiple head dispensing system for dispensing material on one or more substrates. In a multiple head dispensing system, a number of substrates may be dispensed upon in parallel to increase the throughput of the machine. In such a multiple head system, it may be desirable to use a multiple lane conveyor system to transport products into the system. The positioning systems described above are particularly suited for such a multiple head system because of the high working area to total width ratio provided by these positioning systems.

In the embodiments described above, workpieces have been described as being positioned below the gantry system, however, in alternate embodiments, the workpiece may be disposed above the gantry. Also, a product to be dispensed upon could be coupled to the gantry system and positioned as required by the gantry system beneath a fixed dispensing system or beneath a dispensing system positionable by a second gantry system.

Having described embodiments of the present invention, it should be apparent that modifications can be made without departing from the scope of the present invention. For example, while the system here has been described as being mounted on rails, it could also be mounted on another type of frame, such as a solid platform; while the drive for the nut blocks has been shown as a drive screw, a motor and belt could be used if desired; the carriage mounted on the movable block is shown moving along two bearings, although only one bearing may be necessary. While a rotary encoder has been mentioned above for use in determining rotary position, other rotary position sensors, such as resolvers, could be used.

What is claimed is:

1. A system for positioning an instrument for performing a task, the system comprising:

a frame;

a plate mounted to the frame for movement along a first axis relative to the frame;

a carriage for holding the instrument and mounted to the plate for movement relative to the plate along a second axis perpendicular to the first axis;

a first block and a second block, each mounted to the frame and spaced apart along the second axis, each block being movable relative to the frame along the first axis;

a first rigid arm pivotally connected to the first block and pivotally connected to the carriage;

a second rigid arm pivotally connected to the second block and pivotally connected to the carriage; and a first and second drive mechanisms separately operable for moving the respective first and second blocks along the first axis such that the carriage is movable over a plane defined by the first and second axes.

* * * * *